United States Patent Office 3,288,289
Patented Nov. 29, 1966

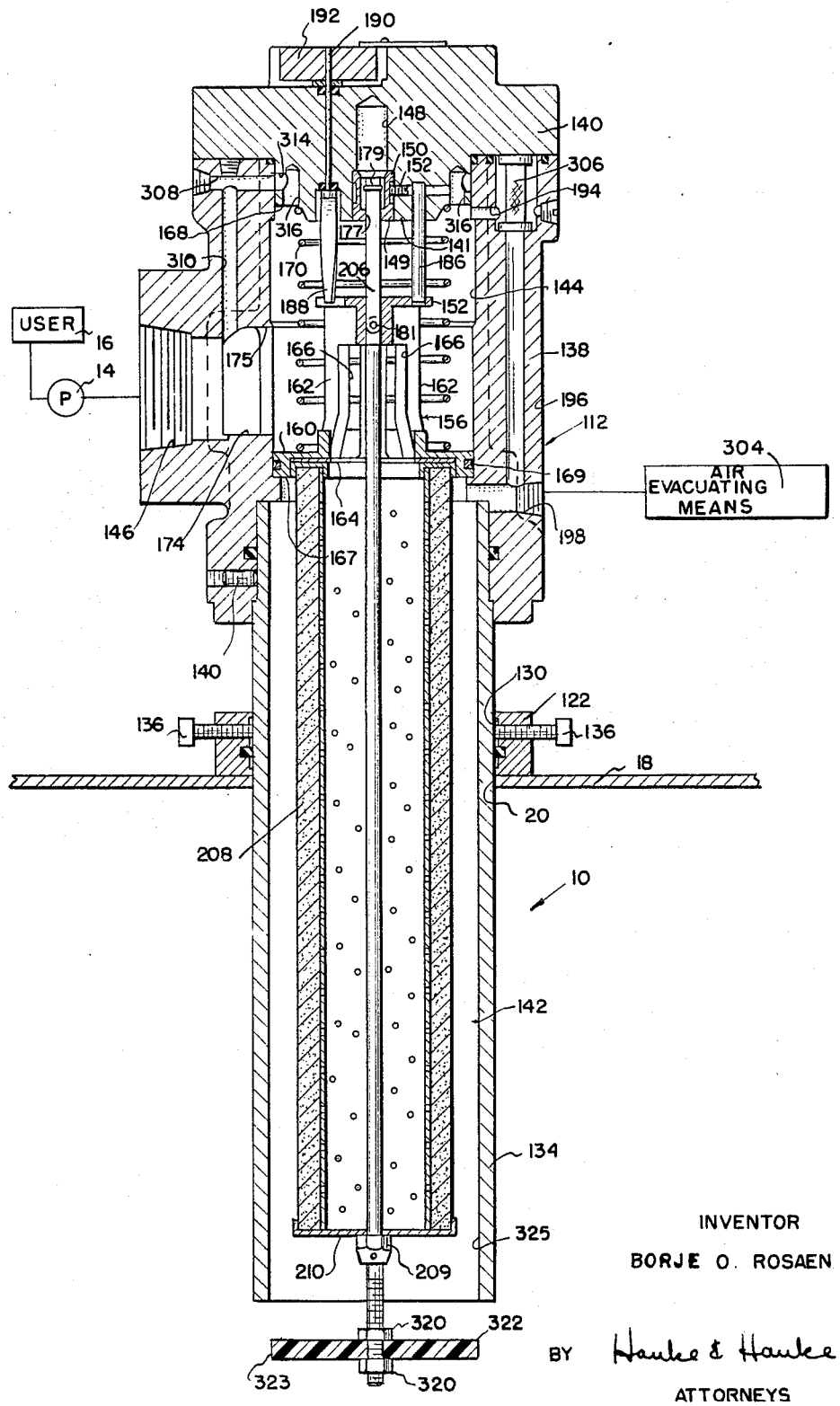

3,288,289
MOBILE FILTER WITH CONTAMINANT COLLECTING MEANS
Borje O. Rosaen, Ann Arbor, Mich., assignor to The Rosaen Filter Company, Hazel Park, Mich., a corporation of Michigan
Filed Oct. 12, 1964, Ser. No. 403,183
9 Claims. (Cl. 210—90)

The present invention relates to fluid systems, particularly to those fluid systems having a filter device adapted to be readily inserted into and removed from a reservoir for such systems and more particularly to an improvement for such a filter device comprising a means for collecting contaminant dislodged from the inlet side of the filter element as the element is being removed for purposes of cleaning or replacement.

Certain copending applications Ser. Nos. 279,930 and 279,935, each having a filing date of May 13, 1963, now abandoned in favor of continuation-in-part applications Serial Nos. 340,365 and 341,488 respectively, each filed January 27, 1964; Ser. Nos. 313,524 and 313,627, each having the filing date of October 3, 1963, disclose certain new mobile or bayonet filter devices which are adapted to be inserted into the reservoir of fluid systems. These new filter devices have the particular advantage that much of the housing structure heretofore necessary for filter devices is eliminated. This produces a substantial reduction in manufacturing costs for such devices. Further, the filter devices are readily accessible for removal of the filter element for cleaning or replacement and means are provided for bypassing the filter element when it reaches a predetermined clogged condition. Indicating means are provided exteriorly of the device for indicating the condition of the filter element.

These filter devices have proven to be quite satisfactory. However, it has been found that as the filter element of such devices is being removed for purposes of cleaning or replacement, a small amount of fluid tends to flow in a reverse direction through the filter element. This reverse flow tends to dislodge some amount of foreign particles trapped by the filter element and to carry such foreign particles back into the reservoir of the fluid system. The present invention provides an improvement for such filter devices by providing means in the form of a filter disc carried at the interior end of the filter element and engaging the sides of the tubular filter housing as the filter element is being removed to collect any contaminants which tend to be dislodged from the element as the element is being removed for cleaning or replacement.

It is an object then of the present invention to improve filter devices such as those disclosed in the aforementioned copending applications by providing means for collecting contaminants dislodged from the filter element as the filter element is being removed for cleaning or replacement.

Still further objects and advantages of the present invention will be readily apparent to one skilled in the art to which the invention pertains upon reference to the following drawings illustrating a longitudinal cross-sectional view of a preferred filter device of the present invention and showing diagrammatically several components of a preferred system connected to the device.

Now referring to the drawing for a more detailed description of the present invention, a preferred fluid system is illustrated as comprising a fluid reservoir 10, a filter device 112, a fluid pump 14, and a fluid user 16. The fluid reservoir 10 preferably comprises a top plate 18 and is at least partially filled with a suitable fluid (not shown). An opening 20 is provided in the plate 18. The filter device 112 preferably comprises a mounting member 122 carried by the top plate 18 of the reservoir 10. An elongated tubular housing member 134 extends through an opening 130 provided in the mounting member 122 and through the opening 20 provided in the top plate 18 into the reservoir 10. The tubular housing member 134 is adjustably secured to the mounting member 122 by means of bolts or screws 136.

The filter 112 preferably further comprises a housing member 138 closing the upper end of the tubular housing member 134 and secured thereto by bolts or screws 140. The tubular housing member 134 forms a filter chamber 142 and the housing member 138 forms an outlet chamber 144 in communication with the filter chamber 142. The housing member 138 is provided with an outlet 146 opening radially to the outlet chamber 142 through a substantially annular chamber 174 and a plurality of annularly spaced ports 175.

A cap member 140 is preferably secured to the housing member 138 by any convenient means such as bolts or screws (not shown) and closes the outlet chamber 144. The cap member 140 is provided with a boss portion 141 extending into the housing member 138 and having an axial recess 148 having a radially enlarged portion 149. A cylindrical cup member 150 is carried in the enlarged portion 149 of the recess 148 by means of a set screw 152. An elongated rod 206 extends axially through an opening 177 provided in the cap member 150 and is axially slidably mounted in the cup member 150. Separation of the cup member 150 and the rod 206 is prevented by a snap ring 179.

A porting member 156 is fixed to the rod 206 by means of a pin 181 to move axially therewith in the outlet chamber 144. The porting member 156 comprises an upper substantially annular radially extending portion 152 and a lower annular radially extending portion 160 joined by axially extending legs 162. The lower portion 160 is provided with a peripheral flange 167 which carries a piston ring 169 engaging the inner wall of housing 138 and a central opening 164 communicating with the interior of the filter chamber 142. The legs 162 define annularly spaced ports 166 providing communication between the central opening 164 and the outlet 146 through ports 175 and chamber 174.

The boss portion 141 of the cap member 140 is further provided with a recessed portion 168 which forms a seat for one end of a spring 170. The other end of the spring 170 is seated against the lower portion 160 of porting member 156 and urges the porting member 156 axially away from the cap member 140.

The rod 206 is enlarged somewhat axially downwardly of the pin 181 and extends through the porting member 156 and into the filter chamber 142. A substantially cylindrical filter element 208 is carried by the rod 206 within the filter chamber 142 and is locked to the lower portion 160 of porting member 156 by means of a nut 209 and a closure plate 210.

The upper portion 152 of porting member 156 is slotted to receive a guide pin 186 and an actuator element 188. The actuator element 188 is twisted about its longitudinal axis and is secured to a shaft 190 which is in turn secured to a pointer element 192 carried exteriorly of the cap member 140 so that axial movement of the actuator element 188 produces a corresponding rotational movement of the shaft 190 and the pointer element 192. The pointer element 192 rotates with the shaft 190 and points to suitable indicia (not shown) provided on the exterior surface of the cap member 140. It is apparent then that upon axial movement of the porting member 156 the actuator element 188 engages in the slot provided in the upper portion 152 to produce a corresponding rotation of the shaft 190 and the pointer element 192 so that if suitable indicia is provided on the exterior surface of the cap member 140 the axial position of the porting member 156 will be indicated by the pointer element 192.

The housing member 138 is provided with an axially extending recess 196 communicating with a radially extending air outlet passage 198. The passage 198 extends into the upper portion of the filter chamber 142 on the inlet side of filter element 180. A radially extending passage 194 provides communication between the upper portion of the outlet chamber 144 and passage 196. A filtering means 306 is carried in the passage 196. An air evacuation means 304 is connected to the passage 198.

An annular recess 314 is provided in the cap member 140 and a plurality of axially extending passages 316 provided communication between the upper portion of the outer chamber 144 and the recess 314. The housing member 138 is provided with a passage 308 registering with recess 314 and passage 310 providing communications between the passage 308 and chamber 174.

The operation of the fluid system as it has thus far been described is as follows:

Fluid is normally pumped by the pump 14 from the reservoir 110 and into the filter chamber 142, radially inwardly through the filter element 208, through the slots 164 and ports 166 provided in the porting member 156, and into the outlet chamber 174 and through the outlet 146 to the user 16.

As the filter element 208 becomes clogged an increase in the pressure differential across the element will be produced. Since the upper surface of the flange 167 of porting member 156 is exposed to the pressure on the outlet side of the filter element 208 and the lower surface of flange 167 is exposed to pressure on the inlet side of the filter element 208 when the increased pressure differential reaches a value sufficient to overcome the force exerted by the spring member 170, the porting member 156 will move axially toward the cap member 140. As heretofore pointed out, each change in the axial position of the porting member 156 will produce a corresponding change in the position of the pointer element 192. Thus with proper indicia (not shown) on the exterior surface of the cap member 140 the clogged condition of the filter element 208 will be visibly indicated exteriorly of the filter device 112.

As the filter element 208 continues to become clogged and prior to the danger of the increased pressure differential across the element 208 causing the same to rupture, the porting member 156 will have moved axially sufficiently to open a fluid path directly from the inlet side of the filter element 208 past the flange portion 167 of porting member 156 and into the outlet chamber 174 to the outlet 146.

When it is desired to remove the filter element 208 for cleaning or replacing, the cap member 140 is removed. The removal of the cap member 140 will cause the porting member 156 and the filter element 208 to be removed from the device 112 since each of these elements is secured one to the other. The filter element 208 then can be readily cleaned and/or replaced.

After the filter element 208 has been cleaned or replaced and is installed with the porting member 156 back into the filter device 112, the air evacuation means 304 is actuated to remove air trapped in the upper portion of the outlet chamber 142 and in the interior of the filter element 208 by means of the passages 316, 194 and 196 and also to remove trapped air from the upper portion of the filter chamber 42 on the inlet side of the filter element 208 by means of the passage 198.

During operation of the filter system the pump 14 causes air which would otherwise become entrapped within the filter housing 138 to be sucked from the upper portion of the outlet chamber 44 through the passages 316, 314, 308 and 310 out the outlet 146. Further, air which would normally become entrapped in the upper portion of the filter chamber 142 on the inlet side of the filter element 208 will be sucked by the pump 14 through the passages 198, 196 and 194 into the upper portion of chamber 144 where it will be directed by the passages 316, 314, 308 and 310 out the outlet 146. The filtering member 306 insures that any fluid that may bypass the filter element 208 with entrapped air during operation of the system will become filtered before passing through the outlet 146.

What has thus far been described has been described and claimed in one or more of the aforementioned copending applications. The present invention comprises the improvement which will now be described in detail.

The free end of the rod 206 extends downwardly past the opening into the reservoir 10 defined by the tubular housing 134. The free end of the rod 206 is threaded and spaced nut members 320 carried by the rod 206 provide the means for carrying a filter disc 322 in a position axially spaced from the opening defined by the interior end of the tubular housing 134. The filter disc 322 is dimensioned so that its outer annular edge 323 axially slidably engages the inner cylindrical surface 325 of the tubular housing 134 upon movement of the filter disc 322 axially inwardly through the tubular housing 134. The filter disc 322 is preferably constructed of a sponge like or similar material which will permit fluid passage therethrough but which will prevent the passage of foreign particles, contaminants and the like. As will be more apparent as the description proceeds it is preferred that the distance between the upper surface of the filter disc 322 and the lower edge of the tubular housing 134 be less than the axial dimension of the central boss portion 141 of the cap member 140.

As the cap member 140, porting member 156, and the filter element 208 are being removed for purposes of cleaning or replacement of the filter element 208 a certain amount of back flow or radial outward flow of fluid through the filter element 208 is produced. In the filter devices heretofore disclosed, no means were provided for collecting the foreign particles dislodged from the exterior surface of the filter element 208 produced by this backflow. Thus such foreign particles would tend to fall back into the reservoir 10 to be again collected and accumulated upon the exterior surface of the filter element as the system is again set into operation. The filter disc 322 provides a means of collecting the foreign particles and contaminants dislodged as the filter element 208 is being removed. The fluid retained within the filter element 208 as it is being removed from the tubular housing 134 will flow radially outwardly through the filter element 208 and axially downwardly through the filter disc 322 back into the reservoir 10. Any particles dislodged from the exterior surface of the filter element 208 will then be caught and collected by the filter disc 322 so that upon removal of the assembly from the tubular housing 134 the foreign particles so dislodged can be removed from the fluid system by cleaning the filter disc 322. By spacing the filter disc 322 an axial distance from the end of the tubular housing 134 less than the axial dimension of the boss portion 141 of cap member 140 engagement of the edge 323 of the filter disc 322 with the inner wall 325 of the tubular housing 134 is provided before any appreciable backflow is produced through the filter element 208.

It is apparent that although I have described but a single embodiment of my invention many changes and modifications can be made therein without departing from the spirit of the invention as expressed by the appended claims.

I claim:
1. A filter device comprising,
   (a) a housing having an interior wall defining a filter chamber,
   (b) a filter assembly carried in said filter chamber and means for removing said filter assembly from said chamber in one direction,
   (c) said filter assembly comprising a filter element carried in said chamber in a position spaced from said wall and a filter member carried in a position spaced from said filter element in a direction opposite to the direction of removal of said filter assembly from said filter chamber, and (d) said filter member being dimensioned to provide an edge slidably engaging said wall upon removal of said assembly from said chamber.

2. A filter device comprising,
(a) a housing having an interior wall defining a filter chamber,
(b) a cap member removably carried by said housing and closing one end of said filter chamber,
(c) a filter assembly carried by said cap member and normally positioned within said filter chamber whereby upon removal of said cap member from said housing said filter assembly is removed from said filter chamber,
(d) said filter assembly comprising a filter element and a filter member, said filter member being spaced from said cap member and said filter element being positioned intermediate said filter member and said cap member,
(e) said filter member having an edge slidably engaging said wall upon removal of said filter assembly from said chamber.

3. A filter device comprising
(a) a tubular housing having an interior wall defining a filter chamber,
(b) a cap member closing one end of said tubular housing member and the opposite end of said tubular housing member defining a fluid inlet communicating with said filter chamber,
(c) a filter assembly carried by said cap member and normally positioned within said filter chamber whereby upon removal of said cap member said filter assembly is removed from said filter chamber,
(d) said filter assembly comprising a filter element carried in said filter chamber in a position spaced from said wall and a filter member positioned on the fluid inlet side of said filter element whereby upon removal of said filter assembly from said fluid chamber said filter element is removed before said filter member,
(e) said filter member being provided with an edge slidably engaging said wall upon removal of said assembly from said chamber.

4. A filter device comprising
(a) an elongated tubular member having open ends,
(b) a cap structure closing one of said ends,
(c) a filter assembly including a filter cartridge carried by said cap structure and removably disposed in said tubular member,
(d) the other of said ends being submerged in a fluid,
(e) an outlet open to the interior of said tubular member through the side thereof with said filter cartridge disposed intermediate said outlet and the submerged end,
(f) said filter assembly further comprising a filter member carried adjacent the submerged end of said tubular member and having an edge engaging the interior wall of said tubular member upon removal of said filter assembly from said tubular member.

5. A filter device comprising
(a) an elongated tubular member having open ends, one of which is submerged in a fluid,
(b) a cap structure closing the other end of said tubular member,
(c) an elongated support element carried by said cap structure and extending axially into said tubular member,
(d) a tubular filter cartridge carried by said support element and disposed in said tubular member and spaced inwardly therefrom,
(e) an outlet open at the end of said tubular member intermediate said cartridge and said cap structure, and (f) a filter member carried by said support element in a position spaced from said filter cartridge and adjacent the submerged end of said tubular member, said filter member having an edge to engage the interior wall of said tubular member upon removal of said support member from said subular member.

6. In combination with a fluid reservoir having an upper wall a filter device comprising
(a) a tubular member having an inner cylindrical surface, an open inlet end and an open end opposite said inlet end,
(b) means positioning said tubular member to depend from said upper wall of said reservoir vertically into said reservoir with the inlet end below the level of fluid in said reservoir and said opposite end disposed exteriorly of said upper wall,
(c) a housing structure including a portion mounted to said opposite end of said tubular member and provided with an outlet,
(d) a filter assembly and means mounting said filter assembly in said tubular member intermediate said inlet end and said outlet end; said filter assembly being vertically upwardly removable from said tubular member and said filter assembly including an annular filter element having an outer surface in communication with said inlet end and an inner surface in communication with said outlet, and
(e) a circular filter member mounted to said filter assembly and supported beneath said filter element, said filter member normally positioned exteriorly of said inlet end of said tubular member and having an annular edge engaging said inner surface of said tubular member upon removal of said filter assembly from said tubular member.

7. The combination as defined in claim 6 and in which said filter device includes
(a) pressure responsive means operable to axially move in response to changes and in the pressure differential across said filter element,
(b) indicating means carried exteriorly of said reservoir and operably connected with said pressure responsive means to indicate the axial position thereof whereby to indicate the degree of clogging of said filter element.

8. The combination as defined in claim 6 and in which said filter device includes
(a) pressure responsive means operable to axially move in response to changes and in the pressure differential across said filter element,
(b) valve means associated with said pressure responsive means and operable to open a fluid path directly from said inlet end to said outlet bypassing said filter element upon said pressure responsive means moving to a predetermined axial position.

9. The combination as defined in claim 6 and in which said filter device further comprises
(a) said filter assembly mounting means comprising a rod carried by said housing structure and extending vertically into said tubular member,
(b) said filter assembly axially slidably mounted on said rod, and
(c) said rod extending beyond said inlet end of said tubular member and said filter member being mounted on the end of said rod.

References Cited by the Examiner
UNITED STATES PATENTS

| | | | |
|---|---|---|---|
| 1,405,873 | 2/1922 | Sellin | 210—318 X |
| 2,057,779 | 10/1936 | Jacobs | 210—172 |
| 2,983,384 | 5/1961 | Winslow | 210—130 X |
| 2,994,403 | 8/1961 | Winslow | 210—304 X |
| 3,080,058 | 3/1963 | Rosaen | 210—90 |

REUBEN FRIEDMAN, *Primary Examiner.*

SAMIH N. ZAHARNA, *Examiner.*